United States Patent Office
2,902,378
Patented Sept. 1, 1959

2,902,378

LOW WATER LOSS CEMENT SLURRIES COMPRISING CARBOXYMETHYL DEXTRAN AND SALTS THEREOF

Harry A. Toulmin, Jr., Dayton, Ohio, assignor to The Commonwealth Engineering Company of Ohio, Dayton, Ohio No Drawing. Application November 14, 1956
Serial No. 622,008

4 Claims. (Cl. 106—92)

This invention relates to cement slurries and to a method of cementing.

One of the problems encountered in the cementing of oil wells and in grouting cracks in masonry structures is the set-up time. Cement slurries are usually modified by the inclusion of some material which retards dehydration of the slurry so that the viscosity is not increased due to water loss and can be easily placed in position.

The materials used to retard the dehydration of the slurry have also prolonged the set-up time to an undesirable extent. Also, those materials tend to detract from the strength of the dried cement.

A primary object of this invention is to provide new and improved cement slurries containing a new material which prevents dehydration of the slurry until it is in place and at the same time does not delay the set-up time beyond the normal time required for setting of the cement.

This and other objects are accomplished by the present invention in accordance with which it is found that specific carboxymethyl ethers of specific dextrans, unlike starch and carboxymethyl starch, and in small amounts, effectively inhibit the dehydration of cement slurries without delaying the normal setting time of the cement once it is in place.

The carboxymethyl dextrans used for the present purposes, and which have the unexpected combination of properties mentioned, are derived from water-soluble native, unhydrolyzed dextrans and contain an average of at least 1.0 up to 3.0 carboxymethyl groups per anhydroglucose unit of the dextran.

By "water-soluble native dextran" is meant the dextran produced by the action of certain bacterial strains on sucrose under conventional conditions leading to the production of dextran having a molecular weight estimated to be in the millions and which is precipitated from the fermentate by means of a water miscible aliphatic alcohol or ketone, without hydrolysis before or after such precipitation. Water-soluble native dextrans from which the carboxymethyl ethers may be derived are those bearing the following NRRL (Northern Regional Research Laboratories) designations: *Leuconostoc mesenteroides* B–1146, B–1064, B–1414, B–1145, B–512, B–1066, B–1208, B–1119, B–1417 and so on.

The carboxymethyl ethers of these dextrans have to be prepared under particular conditions in order to assure the substitution of a minimum (average) of 1.0 carboxymethyl group per anhydroglucose unit of the dextran. Unlike the carboxymethyl ethers of starch, cellulose and dextrin, the dextran ethers having the desired minimum content of carboxymethyl groups cannot be obtained by methods involving the production of an intermediate alkali metal-substituted dextran in a non-aqueous, alcoholic medium, and then reacting the intermediate with chloracetic acid. Only very small amounts of sodium are introduced into the dextran in non-aqueous alcoholic medium. The maximum obtainable sodium content of the dextran product so produced is an average of 0.3 sodium per anhydroglucose unit of the dextran.

The degree of substitution of the carboxymethyl ethers obtained by reacting the sodium derivative with chloracetic acid depends on the degree of substitution of the intermediate with respect to the alkali metal.

It follows that the carboxymethyl group content of the dextran ether obtained by reacting the sodium dextran produced by the non-aqueous alcoholic method with chloracetic acid is also a maximum of 0.3 such groups per anhydroglucose unit. Those very low-substituted ethers do not have the combined properties of inhibiting dehydration of the slurry and permitting the cement, after placement thereof, to set in the normal time.

The carboxymethyl dextran incorporated into aqueous cement slurries in the practice of this invention are obtained by reacting the water-soluble, native, unhydrolyzed dextran with an alkali metal chloracetate, such as sodium or potassium chloracetate, in an aqueous solution containing an alkali metal hydroxide such as sodium or potassium hydroxide, at 10° C. to 100° C., for a time varying inversely with the temperature between two hours and about one hour.

The molar ratio of sodium or potassium chloracetate to dextran is between 2:1 and 12:1, the molar ratio of sodium or potassium hydroxide to dextran is between 5:1 and 15:1, and the molar ratio of water to dextran is between 70:1 and 120:1.

The reaction product is a viscous solution of the alkali metal salt, e.g., the sodium or potassium salt of the carboxymethyl dextran in water containing the excess alkali metal hydroxide and chloracetate.

The alkali metal salt of the carboxymethyl dextran can be used in the aqueous cement slurries, particularly if the slurry has a pH on the alkaline side.

The free ether is isolated from the solution of the alkali metal salt, by adjusting the pH of the solution to the acid side and then precipitating the ether from the acidified solution by means of a water-miscible alcohol or ketone. This removes the electrolytes as NaCl. The ether can be precipitated satisfactorily at pH 2.0–3.0.

The following example illustrates the production of a carboxymethyl dextran alkali metal salt and free ether suitable for use in the present improved cement slurries.

One hundred parts of particulate purified native (unhydrolyzed) *L.m.* B–512 dextran were dissolved in 700 parts of water. One hundred and fifty parts of sodium hydroxide were dissolved in 150 parts of water, and the dextran and sodium hydroxide solutions were mixed together with agitation. Two hundred and twenty parts of monochloracetic acid were dissolved in 400 parts of water and 112.3 parts of anhydrous sodium carbonate were added to the solution. The resulting chloracete solution was then slowly added to the mixed dextran and sodium hydroxide solutions, and the mass was heated for one hour at 65° C. The reaction mass was then adjusted to pH 3.0 with hydrochloric acid and poured slowly into 1500 parts of methanol. The precipitate was substantially freed of methanol and water by passage through squeeze rolls, then dried under vacuum and reduced to particulate condition (80 mesh) in a hammer mill. The final product contained, by analysis, an average of about 1.0 carboxymethyl group per anhydroglucopyranosidic unit.

Ethers containing an average of more than 1.0 and up to 3.0 carboxymethyl groups per anhydroglucopyranosidic unit are obtained under the same general conditions except that the amounts of sodium or potassium hydroxide, and of sodium or potassium chloracetate, may be increased as noted above, and/or the reaction time may be extended and may be up to about two hours. Other conditions being equal, an increase in the reaction temperature also results in the introduction of more carboxymethyl groups into the dextran molecule.

Very small amounts of these carboxymethyl dextrans or alkali metal salts, i.e., from 0.01% to 0.1%, are effective to retard the dehydration of the cement slurry without delaying the setting time. Tests show that the slurry is readily pumpable and retains the required fluidity for proper placement thereof for a practical period of time and that the cement, after being placed, sets up in substantially the same time as if the dextran ether or ether salt were not present. This is in contrast to slurries modified by inclusion of other conventional water-loss retardants, such as starch and carboxymethyl starch, which prolong the setting time for as long as 30 minutes and even longer. The carboxymethyl dextran or alkali metal salt does not detract from the strength of the set cement, as do the conventional water-loss retardants but tends to enhance it, which latter effect can be attributed to the extremely high molecular weight (in the millions) of the parent dextran and the fact that, with a minimum average of 1.0 carboxymethyl group per each of the extremely large number of anhydroglucose units making up the dextran molecule, the overall content of carboxymethyl groups is very high.

The slurries of the invention may be made up by mixing the dry ingredients comprising hydraulic cement and carboxymethyl dextran or salt together with, optionally, inert filler material such as sand or crushed limestone. Such mixtures can be prepared in advance and then mixed with water prior to use. Also, the various ingredients can be mixed with water separately and then combined to form the cement slurry, provided that the hydraulic cement is mixed with water immediately before the slurry is used.

The term "hydraulic cement" is intended to include all mixtures which are commonly known as hydraulic cement. This includes mixtures of lime, silica and alumina, or of lime and magnesia, silica and alumina and iron oxide (magnesia, for instance, may replace part of the lime, and iron oxide a part of the alumina). Hydraulic cements include hydraulic limes, grappier cements, pozzuolanic cements, natural cements and Portland cements. Pozzuolanic cements include slag cements made from slaked lime and granulated blast furnace slag. Portland cement is a preferred hydraulic cement because of its superior strength.

The carboxymethyl dextran or alkali metal salt is also effective in retarding dehydration, without increase in setting time, of those aqueous cement slurries which are modified by the inclusion of inert granular fillers such as sand, ground limestone, or the like.

The water used with the dry ingredients to make the slurry is just sufficient to render the slurry fluid and easily pumpable.

As an example of the practice of the invention, the following is given:

A Portland cement slurry is made up with fifteen pounds of cement to the gallon of slurry, and there is added to it about 0.05% of carboxymethyl dextran derived from *L.m.* B-512 native, unhydrolyzed dextran and containing an average of 1.0 carboxymethyl group per anhydroglucose unit. The slurry, which remains fluid and does not dry out on standing, is readily pumpable and sets promptly when placed. In comparison, a similar Portland cement slurry was prepared, but without the inclusion of the carboxymethyl dextran. If the slurry were placed immediately and the amount used was small, as in a minor grouting operation, the slurry could be placed and set in the normal time, but the slurry could not be allowed to stand for even a short period without some drying out which made it more difficult to pump. A similar Portland cement slurry was prepared containing 0.05% of carboxymethyl starch. The slurry remained pumpable for a longer time than the "neat" slurry, but setting thereof was delayed for some 20-30 minutes.

It will be understood that the example given is for purposes of illustration and that some changes and modifications may be made in details in practicing the invention. Since such changes may be made without departing from the spirit and scope of the invention, it is intended to comprehend them in the appended claims.

This application is a continuation-in-part of application Serial No. 440,850, filed July 1, 1954, and now abandoned.

What is claimed is:

1. A fluid, pumpable, hydraulic cement slurry consisting essentially of a hydraulic cement, an amount of water sufficient to render the slurry initially fluid and pumpable and, for maintaining the initial fluidity and pumpability of the slurry prior to placement without delaying the setting time for the cement after placement of the slurry, from about 0.01% to about 0.1% of a substance selected from the group consisting of carboxymethyl ethers of native, water-soluble, unhydrolyzed dextrans containing an average of from 1.0 up to 3.0 carboxymethyl groups per anhydroglucose unit, and alkali metal salts of said ethers.

2. A fluid, pumpable, hydraulic cement slurry as in claim 1, characterized in containing from about 0.01% to about 0.1% of a carboxymethyl ether of a native, water-soluble, unhydrolyzed dextran containing an average of from 1.0 up to 3.0 carboxymethyl groups per anhydroglucose unit.

3. A fluid, pumpable, hydraulic cement slurry as in claim 1, characterized in containing from about 0.01% to about 0.1% of an alkali metal salt of a carboxymethyl ether of a native, water-soluble, unhydrolyzed dextran containing an average of from 1.0 up to 3.0 carboxymethyl groups per anhydroglucose unit.

4. In the making of an aqueous hydraulic cement slurry consisting essentially of the cement and sufficient water to produce an initially fluid and pumpable slurry, the improvement which comprises prolonging the fluid, pumpable condition of the slurry prior to placement thereof, without delaying the setting time for the cement after placement of the slurry or decreasing the strength of the set cement, by including in the slurry a small amount of a substance selected from the group consisting of carboxmethyl ethers of native, unhydrolyzed, water-soluble dextrans containing an average of from 1.0 up to 3.0 carboxymethyl groups per anhydroglucose units.

References Cited in the file of this patent
UNITED STATES PATENTS

| | | |
|---|---|---|
| 2,360,327 | Bailey et al. | Oct. 17, 1944 |
| 2,562,148 | Lea | July 24, 1951 |
| 2,673,810 | Ludwig | Mar. 30, 1954 |